United States Patent [19]
Journeau

[11] Patent Number: 6,031,742
[45] Date of Patent: Feb. 29, 2000

[54] DC VOLTAGE CONVERTER WITH IMPROVED EFFICIENCY

[75] Inventor: Jacques Journeau, Colomby, France

[73] Assignee: U.S. Philips Corporation, New York, N.Y.

[21] Appl. No.: 09/221,949

[22] Filed: Dec. 28, 1998

[30] Foreign Application Priority Data

Dec. 31, 1997 [FR] France ................................ 97 16762

[51] Int. Cl.[7] ................................................ H02M 7/00
[52] U.S. Cl. ................................................ 363/60; 307/110
[58] Field of Search .............................. 363/59, 60, 124, 363/131; 307/110

[56] References Cited

FOREIGN PATENT DOCUMENTS

0468735A1  1/1992  European Pat. Off. .

OTHER PUBLICATIONS

"The Mosmarx Voltage Mutiplier", by P.E.K. Donaldson, Electronics and Wireless World, pp. 748–750. No date.

*Primary Examiner*—Y. J. Han
*Attorney, Agent, or Firm*—Steven R. Biren

[57] ABSTRACT

A DC voltage converter is intended to multiply an input voltage and includes N elementary cells (ECi) in a cascade arrangement, each cell being intended to store the value of the input voltage in two capacitors (Ci1, Ci2). The charging and discharging of the capacitors (Ci1, Ci2) is controlled by transistors (Ni1, Ni2) whose conduction is controlled by the same control signal.

4 Claims, 2 Drawing Sheets

DC VOLTAGE CONVERTER WITH IMPROVED EFFICIENCY

FIELD OF THE INVENTION

The present invention relates to a DC voltage converter of the multiplier type, having a control input and a reference input intended to receive a periodic control signal and a reference voltage respectively, and an output, the converter comprising N elementary cells in a cascade arrangement, each cell having a first and a second input terminal connected to the first terminal of a first and of a second capacitor respectively, and a first and a second output terminal connected to the second terminals of said capacitors respectively, the second input terminal being connected to the first output terminal via a first unidirectional current conducting element, the first output terminal being connected to the second output terminal via a second unidirectional current conducting element, the input terminals of the first elementary cell forming the inputs of the converter, the second output terminal of the $N^{th}$ elementary cell forming the output of the converter.

BACKGROUND OF THE INVENTION

Such a converter is known from the article "The Mosmarx voltage multiplier" by P. E. K. DONALDSON, published in Electronics and Wireless World. This article notably describes a converter called Cockroft-Walton converter, in which the unidirectional current conducting elements are diodes. When the control signal features an active state, the first capacitor of the $i^{th}$ elementary cell is charged via the first diode of said cell from the second capacitor of the $(i-1)^{th}$ elementary cell, whereas the second capacitor of the $i^{th}$ elementary cell is discharged via the first diode of the $(i+1)^{th}$ elementary cell towards the first capacitor of said cell. When the control signal features an inactive state, the first capacitor of each elementary cell is discharged via the second diode towards the second capacitor of this same cell. The diodes generate on their terminals voltage drops that cannot be neglected, particularly when one wishes to realize such a converter in integrated form. The diodes are then formed by transistors whose collectors and bases in the case of bipolar transistors, or whose drains and gates in the case of MOS transistors, are connected together. The voltage drop on the terminals of such a diode is then typically of the order of 0.6 V. As each elementary cell contains two diodes, the cell generates a voltage drop of which the value is of the order of 1.2 V. There is thus a voltage drop of N.(1.2 V) in the whole converter, which renders its use not very advantageous for values of N higher than 2, particularly in "low voltage" applications.

It is an object of the present invention to largely remedy this drawback by proposing a DC voltage converter in which the voltage drops generated by the unidirectional current conducting elements are substantially zero.

SUMMARY OF THE INVENTION

Indeed, according to the present invention, a DC voltage converter as defined in the opening paragraph is characterized in that the first and second unidirectional current conducting elements of each elementary cell are formed by first and second transistors whose conduction is controlled by a signal generated on the basis of the control signal.

In such a converter, the voltage drops on the terminals of the main current paths of the transistors are very small, which enables to connect a large number of elementary cells in cascade and thus to obtain a large multiplying factor between the reference voltage and the output voltage of the converter.

A particular embodiment of the invention features a DC voltage converter as described above, characterized in that it comprises an inverter, inserted between the control input and the first input of the first elementary cell, and in that the first and the second transistor of each elementary cell has a different conductivity type, the bias terminals of the first and second transistors further being respectively connected to the second input terminal and to the first output terminal of the cell via a first and a second diode, and to the control input via coupling capacitors.

This embodiment makes full use of the periodicity of the control signal for controlling the conduction of the transistors in a simple manner in order to let the first and second capacitors of each cell charge and discharge successively. The first and second diodes enable to adjust the values of the DC components of the voltages present on the bias terminals of the transistors, so that they do not run the risk of being damaged during their switching. Another advantage of this embodiment is to set a high and a low limit to the potential of each of the bias terminals of the transistors, which limits flank the thresholds of said transistors.

In a variant of this embodiment, a DC voltage converter as described above is characterized in that the bias terminals of the first and second transistors of the $i^{th}$ elementary cell, for i=2 to N, are connected to the bias terminals of the first and second transistors of the $(i-1)^{th}$ elementary cell via coupling capacitors.

This variant of the invention enables to ensure that the differences of potential applied to the terminals of the coupling capacitors are sufficiently low so as not to damage the dielectric material forming them.

The DC voltage converter enables to obtain an output voltage whose value is (N+1) times larger than the value of the reference voltage. This output voltage may advantageously be used for biasing diodes of the varicap type inside a voltage-controlled oscillator, in which the value of the bias voltage of said diodes determines their capacitive value, and thus the frequency of the output signal of the oscillator. A small variation of the reference voltage may thus cause a significant modification of this output frequency.

In one of its applications, the invention hence also relates to a radio signal selection device comprising:

an antenna and filter system intended for the reception of said signals and for their conversion into electronic signals, a low-noise amplifier intended to amplify the signals coming from the antenna and filter system, a voltage-controlled oscillator intended to generate a signal whose frequency depends on the value of a signal present on a tuning input of the oscillator, and a mixer having two inputs respectively connected to the output of the low-noise amplifier and of the oscillator, and intended to produce a signal whose frequency is equal to the difference between the respective frequencies of the input signals of the mixer, which device is characterized in that it further includes a DC voltage converter as described above, whose output is connected to the adjusting input of the oscillator and whose reference input is intended to receive voltages whose values determine the frequencies of the selected radio signals.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
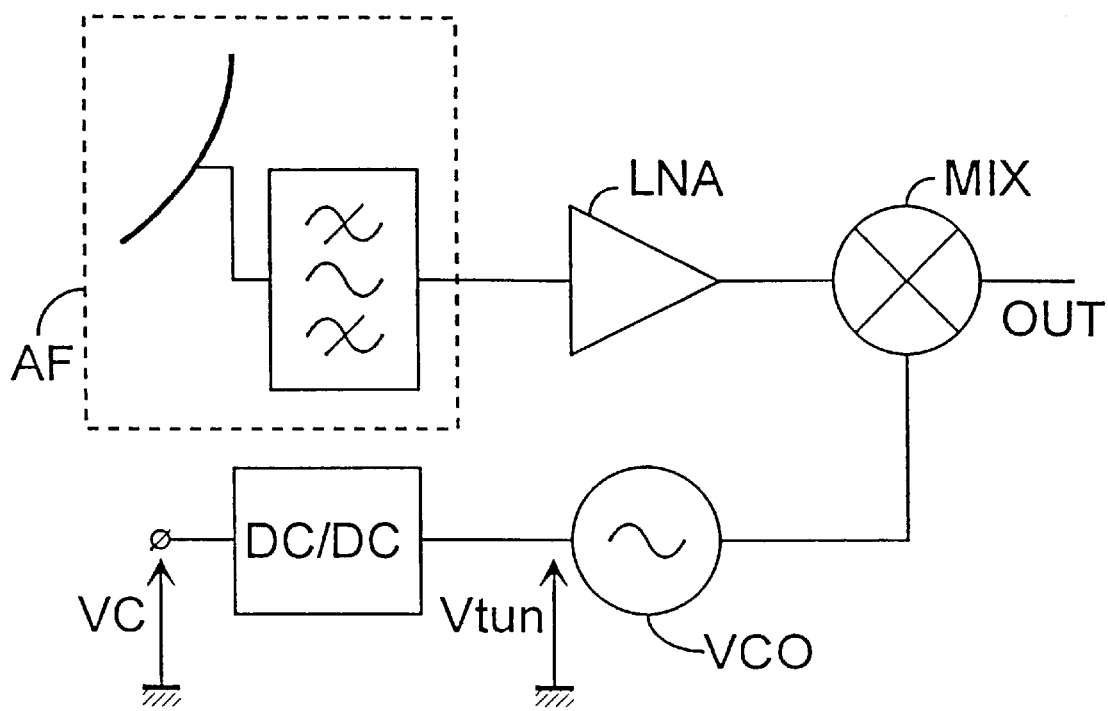
FIG. 1 is a partial function diagram representing a device using a DC voltage converter according to the invention.

FIG. 1 represents a radio signal selection device, comprising:

- an antenna and filter system AF intended to receive said signals and convert them into electronic signals,
- a low-noise amplifier LNA intended to amplify the signals coming from the antenna and filter system AF,
- a voltage-controlled oscillator VCO intended to generate a signal whose frequency depends on the value of a signal Vtun present on a tuning input of the oscillator VCO, and
- a mixer MIX having two inputs respectively connected to the output of the low-noise amplifier LNA and of the oscillator VCO, and intended to produce a signal whose frequency is equal to the difference between the respective frequencies of the input signals of the mixer MIX.

Such a device is commonly realized in the form of an integrated circuit, which is supplied with power between a positive power supply terminal and a ground terminal. In most cases the signal Vtun is used for biasing varicap diodes inside the oscillator VCO, and the reverse voltage on the terminals of said diodes then determines their capacitive value. If no DC voltage converter is used for producing the signal Vtun, the value thereof and, all the more so, the extent of the variations said signal Vtun is likely to feature, are limited by the value of the supply voltage. This value is at present typically of the order of 2 V and doomed to diminish, one of the major concerns of the integrated circuit industry being the reduction of the power consumption and bulkiness of the circuits. The extent of the variations of the signal Vtun thus may be too small to produce significant modifications of the capacitive values of the varicap diodes of the oscillator VCO, and thus of the frequency of the output signal of said oscillator. Therefore, the selection device comprises a DC/DC converter whose output is connected to the adjusting input of the oscillator VCO. The reference input is intended to receive a voltage VC whose variations, even if their amplitude is low, will cause significant modifications in the output frequency of the oscillator VCO, and will enable to cause the frequencies of the radio signals selected by the device to vary. As explained earlier, the known DC voltage converters cause too large voltage drops for being effectively used in an application of this type. A DC/DC converter having a higher efficiency than that of the known converters enables to realize the amplifying function described above.

Figure 2:
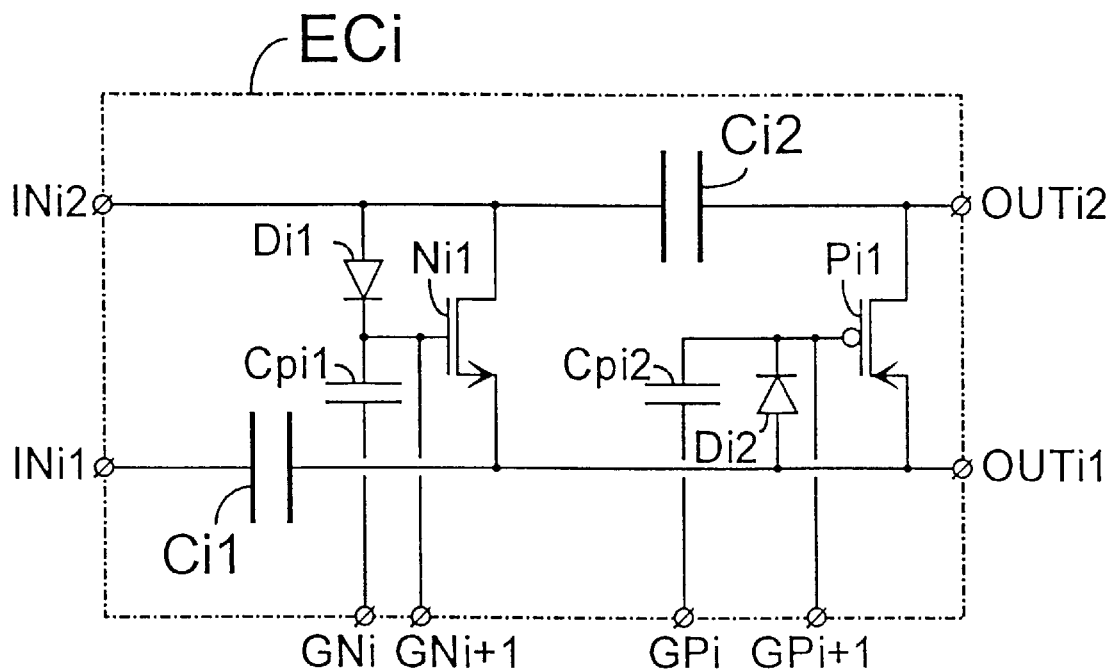
FIG. 2 is an electrical circuit diagram representing an elementary cell included in a voltage converter in accordance with an embodiment of the invention.

FIG. 2 represents an elementary cell ECi chosen among N elementary cells which are arranged in cascade inside a DC voltage converter according to the invention. This cell ECi has a first and a second input terminal INi1 and INi2 connected to the first terminal of a first capacitor Ci1 and of a second capacitor Ci2 respectively, and having a first and a second output terminal OUTi1 and OUTi2 connected to the second terminal of said capacitors Ci1 and Ci2, respectively. The second input terminal INi2 is connected to the first output terminal OUTi1 via a first transistor Ni1, the first output terminal OUTi1 being connected to the second output terminal OUTi2 via a second transistor Pi1. The first transistor Ni1 is in this example an NMOS transistor, the second transistor Pi1 being a PMOS transistor. The bias terminals of the first and second transistors Ni1 and Pi1, which are formed in this case by the gates of said transistors, are connected to the second input terminal INi2 and to the first output terminal OUTi1 respectively, of the cell ECi via a first and a second diode Di1 and Di2, and to control inputs GNi and GPi via coupling capacitors Cpi1 and Cpi2.

The control inputs GNi and GPi are intended to receive the same control signal. When the control signal features an active state, i.e. in this example a logic 1 level, the first transistor Ni1 is conducting, whereas the second transistor Pi1 is cut-off. The first capacitor Ci1 is then charged through the first transistor Ni1 via the second input INi2, i.e. via a second capacitor of an elementary cell ECi-1 (not shown in the Figure), which would be arranged upstream of the cell ECi, whereas the second capacitor Ci2 is discharged towards the second output OUTi2, i.e. towards a first capacitor of an elementary cell ECi-1 (not shown in the Figure) which would be arranged downstream of the cell ECi. When the control signal features an inactive state, i.e., in this example a logic 0 level, the first transistor Ni1 is cut off, whereas the second transistor Pi1 is conducting. The first capacitor Ci1 of the elementary cell ECi is discharged through the second transistor Pi1 towards the second capacitor Ci2 of this same cell ECi.

The function of the first and second diodes Di1 and Di2 is to reference the signals present on the gates of the first and second transistors Ni1 and Pi1 to potentials neighboring drain and source potentials respectively, of said transistors. This enables to minimize the risks of damaging the gate-drain junction of the first transistor Ni1, and the gate-source of the second transistor Pi1, because of too large differences of potential on the terminals of said junctions. Besides, the first and second diodes Di1 and Di2 define ranges of variations of the potentials of the bias terminals of the first and the second transistor Ni1 and Pi1, which ranges of variations include the switching thresholds of said transistors. This enables the switching on of these transistors whatever the value of i, that is to say, whatever the position occupied by the $i^{th}$ elementary cell ECi inside the converter.

Figure 3:
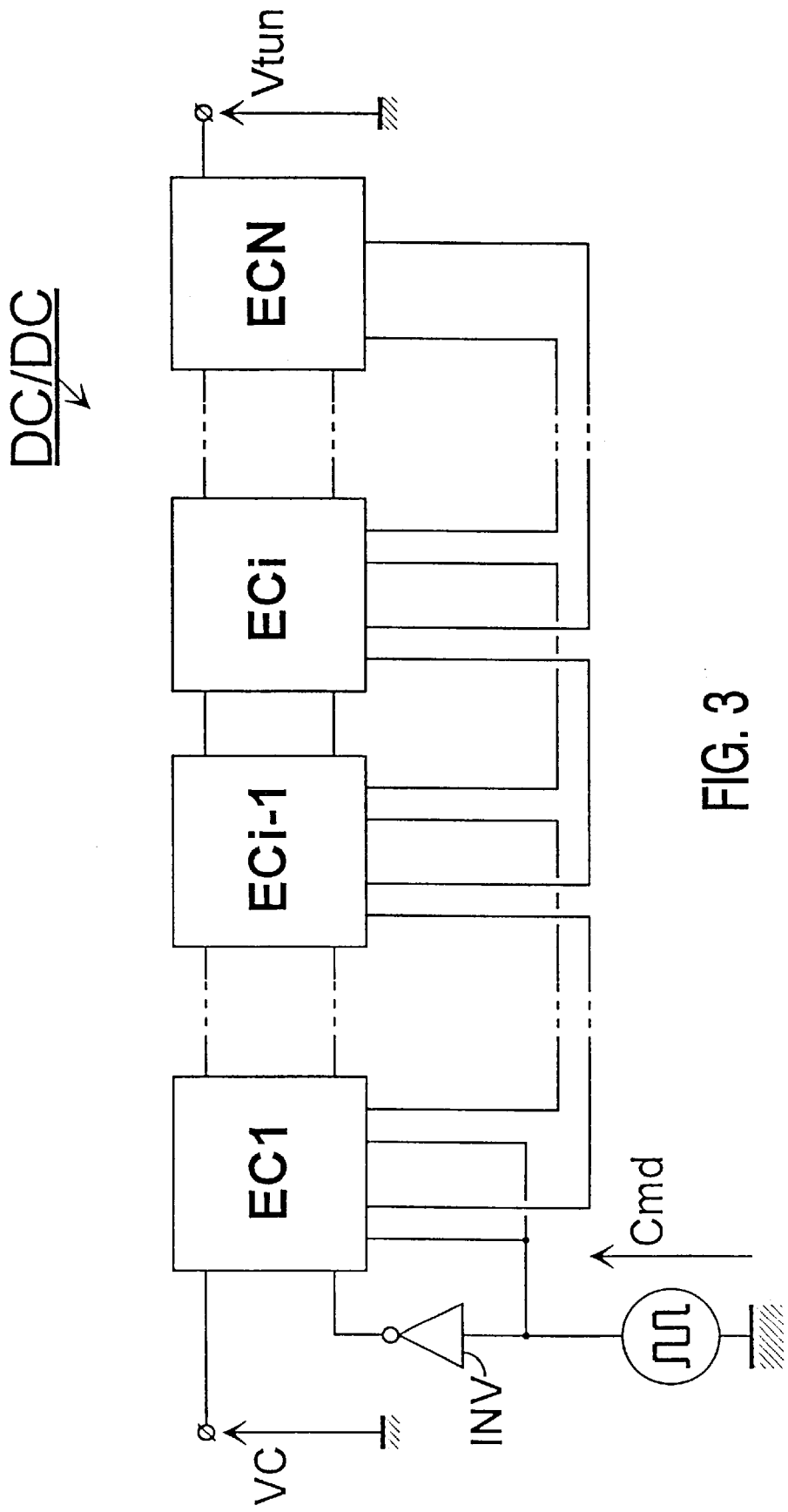
FIG. 3 is an electric circuit diagram representing a voltage converter in accordance with a particular embodiment of the invention.

FIG. 3 represents a DC/DC voltage converter according to a preferred embodiment of the invention. This converter has a control input and a reference input intended to receive a periodic control signal Cmd and a reference voltage VC respectively, and an output intended to supply a voltage Vtun whose nominal value is N times higher than the reference voltage VC. This DC/DC converter comprises N elementary cells ECi, for i=1 to N, in accordance with the above description and arranged in cascade, the input terminals of the first elementary cell EC1 forming the inputs of the DC/DC converter, the second output terminal of the $N^{th}$ elementary cell ECN forming the output of the DC/DC converter. In this particular embodiment the DC/DC converter comprises an inverter INV inserted between the control input and the first input of the first elementary cell. This inverter INV will advantageously be realized in the CMOS form by means of a PMOS transistor and an NMOS transistor whose main current paths will be connected in series between the first and the second input terminals of the first elementary cell EC1, in such a way that the amplitude of the output signal variation of the inverter INV is equal to the value of the reference voltage VC. In the variant of the invention represented here, the gates of the first and second transistors of the $i^{th}$ elementary cell ECi, for i=2 to N, are connected to the bias terminals of the first and second transistors of the $(i-1)^{th}$ elementary cell via the first and second coupling capacitors Cpi1 and Cpi2. This is realized by connecting the terminals GNi and GPi of the $i^{th}$ elementary cell ECi to the terminals GNi and GPi of the $(i-1)^{th}$ elementary cell ECi-1. This variant of the invention enables to ensure that the DC voltage present on the terminals of the first and second coupling capacitors Cpi1 and Cpi2 is always of the order of VC whatever the value of i. If the coupling capacitors were directly connected to the control input of the converter, the DC voltage present on the terminals of the first and second coupling capacitors Cpi1 and Cpi2 of the $i^{th}$ elementary cell ECi would be of the order of $(i+1)$.VC. Beyond a certain value of i, this voltage could become high enough to cause damage to the dielectric forming the first and second coupling capacitors Cpi1 and Cpi2.

When such a DC voltage converter is switched on, a transient mode sets in during which the first and second capacitors of the N elementary cells ECi, for i-1 to N, are progressively charged in the direction of the increasing values of i. In conformity with the operation described above, the first capacitor C11 of the first elementary cell EC1 is charged under the voltage VC when the control signal Cmd is active, and is subsequently discharged into the second capacitor C12 of said elementary cell EC1 when the control signal Cmd becomes inactive. This second capacitor C12 is discharged into the first capacitor C21 of the second elementary cell EC2 when the control signal Cmd becomes active again, the first capacitor C11 of the first elementary cell EC1 being simultaneously recharged under the voltage VC. When the control signal Cmd becomes inactive again, the first capacitors C11 and C21 of the first and second elementary cells EC1 and EC2 are discharged into the second capacitors C12 and C22 of said elementary cells EC1 and EC2, respectively. This process is repeated and is spread out until a permanent mode is established, in which the voltage on the terminals of each capacitor Ci1 and Ci2, for i=1 to N, is close to VC. In this permanent mode, the chargings and dischargings of the capacitors continue to occur, but on a small scale, and the output voltage Vtun is substantially equal to $(N+1)$.VC.

What is claimed is:

1. A DC voltage converter of the multiplier type, having a control input and a reference input for receiving periodic electrical control signal and a reference voltage respectively, and an output, the converter comprising N elementary cells in a cascade arrangement, each cell having a first and a second input terminal connected to the first terminal of a first and of a second capacitor respectively, and a first and a second output terminal connected to the second terminals of said capacitors respectively, the second input terminal being connected to the first output terminal via a first unidirectional current conducting element, the first output terminal being connected to the second output terminal via a second unidirectional current conducting element, the input terminals of the first elementary cell forming the inputs of the converter, the second output terminal of the $N^{th}$ elementary cell forming the output of the converter, characterized in that the first and second unidirectional current conducting elements of each elementary cell are formed by first and second transistors whose conduction is controlled by a signal generated on the basis of the electrical control signal.

2. A DC voltage converter as claimed in claim 1, characterized in that it comprises an inverter inserted between the control input and the first input of the first elementary cell, and in that the first and the second transistor of each elementary cell has a different conductivity type, the bias terminals of the first and second transistors further being respectively connected to the second input terminal and to the first output terminal of the cell via a first and a second diode, and to the control input via coupling capacitors.

3. A DC voltage converter as claimed in claim 2, characterized in that the bias terminals of the first and second transistors of the $i^{th}$ elementary cell, for i=2 to N, are connected to the bias terminals of the first and second transistors of the $(i-1)^{th}$ elementary cell via coupling capacitors.

4. A radio signal selection device comprising:

an antenna and filter system for receiving signals and for their conversion to electronic signals, a low-noise amplifier for amplifying the electronic signals coming from the antenna and filter system, a voltage-controlled oscillator for generating a signal whose frequency depends on the value of a signal present on a tuning input of the oscillator, and a mixer having two inputs respectively connected to the output of the low-noise amplifier and of the oscillator, for producing a signal whose frequency is equal to the difference between the respective frequencies of the input signals of the mixer, said device further comprising a DC voltage converter as claimed in claim 1 whose output is connected to the adjusting input of the oscillator and whose reference input is intended to receive voltages whose values determine the frequencies of the selected radio signals.

* * * * *